W. J. SLAUGHTER.
SULKY-PLOW.

No. 173,679. Patented Feb. 15, 1876.

WITNESSES
Granville Lewis
William Jackson

By

William J. Slaughter
INVENTOR

C. M. Parks
Attorney

N. PETERS, PHOTO-LITHOGRAPHER, WASHINGTON, D. C.

UNITED STATES PATENT OFFICE.

WILLIAM J. SLAUGHTER, OF GREENFIELD, ILLINOIS.

IMPROVEMENT IN SULKY-PLOWS.

Specification forming part of Letters Patent No. 173,679, dated February 15, 1876; application filed July 2, 1875.

*To all whom it may concern:*

Be it known that I, WILLIAM J. SLAUGHTER, of Greenfield, Greene county, Illinois, have invented an Improvement in Sulky-Plows; and I do hereby declare the following to be a full and correct description of the same, reference being had to the accompanying drawings, in which—

Figure 1:
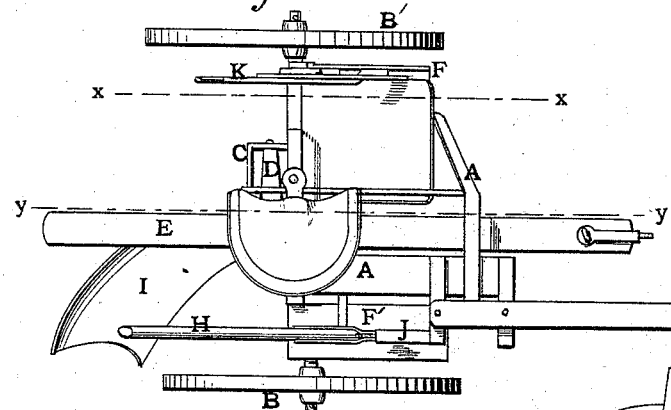
Figure 2:
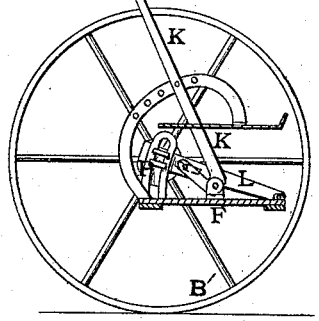
Figure 3:
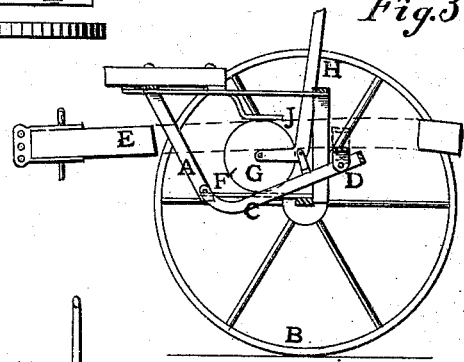
Figure 4:
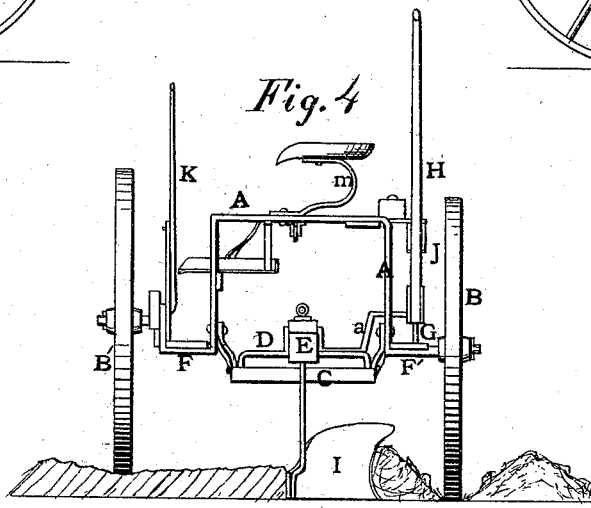

Figure 1 is a top view, and Fig. 2 is a sectional view taken through Fig. 1 on the line $x\ x$. Fig. 3 is a sectional view taken on the line $y\ y$, Fig. 1, and Fig. 4 is a rear view of my device.

The object of my invention is to hang a sulky-plow in such a manner as to make it more free to pass over obstructions, and also to enable the driver to control more readily the operation of the plow; and it consists in the use of a loose pulley-lever, which, in connection with planes above and below it, enables the plow to be raised or forced into the ground beneath.

In the drawings, A represents the frame of my sulky-plow, supported upon two wheels, B B'. Hung upon the forward part of the frame A is the yoke C, and into the opposite end of said yoke C is pivoted an auxiliary yoke, D, upon which the plow-beam E is secured.

Upon either side of the frame A, near the wheels B B', are horizontal planes F F'. Upon the plane F' traverses the pulley G of the pulley-lever H. Said lever H is pivoted to an arm, a, secured to the yoke D, and enables the driver to raise or lower the plow-beam E, carrying the plow I, at pleasure.

Above the pulley G and secured to the forward part of the frame A is another plane, J, against which the pulley G presses when the driver wishes to force the plow into the ground.

Upon the opposite side of the plow upon the plane F is pivoted the bent lever K, carrying upon its short arm a pin, which operates in a slot in the arm L, pivoted to the forward end of the plane F. Upon the opposite end of the arm L is secured the axle of the wheel B', which is made adjustable by means of headed pins operating in a curved slot in the standard P upon the plane F. A curved bar, with graduating-holes, and a pin upon the lever K, holds the arm L and axle of the wheel B' in place.

Dropping from the frame A is a foot-rest for the driver, and upon the top of the frame A is pivoted, upon a spring, $m$, a driver's seat, which can be used in a direct position or turned to either side out of the way, to enable the driver to walk behind the plow.

The operation of my plow is as follows: After the wheel B' is properly adjusted, by means of the lever K, arm L, and slotted standard P, to run on the land side of the furrow, and the pivoted spring-seat adjusted to receive the driver, the power may be applied to the end of the plow-beam E.

It will be observed that as long as the draft is in line with the yoke C, the force will be direct upon the yoke C, but when the plow-beam F is out of line with the yoke C, the force will tend to draw the plow either upward or downward, as the case may be, and assist the driver in regulating the plow. The lever H is in easy reach of the driver, and the pulley G, traveling upon the plane F', causes but little friction, and the plow is raised easily.

When the driver desires to press the plow hard into the ground, he presses the lever back, and the pulley G meets with resistance against the upper plane J, and nearly the whole force exerted is communicated to the plow. The driver's seat may be swung around, and the driver walk behind the plow if he desires.

Having thus fully described my invention, what I claim, and desire to secure by Letters Patent, is—

1. The combination of the plane F', pulley-lever H, yokes C and D, and plow E I, substantially as described.

2. The combination of the plane J, pulley-lever H, yokes C and D, and plow E I, substantially as described.

3. In a plow, the lever H, provided with the pulley G, in combination with the planes F' and J, substantially as described.

The above specification of the said invention signed and witnessed at Greenfield this 24th day of June, A. D. 1875.

WILLIAM J. SLAUGHTER.

Witnesses:
M. T. NICHOLS,
F. E. WOOLLEY.